United States Patent [19]
Sekiguchi et al.

[11] Patent Number: 5,086,727
[45] Date of Patent: Feb. 11, 1992

[54] THIN FILM FORMING APPARATUS HAVING ADJUSTABLE GUIDE

[75] Inventors: Mikio Sekiguchi; Mizuho Imai; Nobuyasu Shiba; Hideyo Iida, all of Tokyo, Japan

[73] Assignee: Taiyo Yuden Co., Ltd., Tokyo, Japan

[21] Appl. No.: 573,240

[22] Filed: Aug. 24, 1990

[30] Foreign Application Priority Data

Aug. 31, 1989 [JP] Japan .................. 1-224980

[51] Int. Cl.$^5$ ............................ B05B 1/34; B05C 5/00
[52] U.S. Cl. ..................... 118/324; 118/326; 118/428
[58] Field of Search ............... 118/59, 314, 325, 326, 118/428, 324, 50; 239/124, 566, 589

[56] References Cited

U.S. PATENT DOCUMENTS 3,881,209 5/1975 Reinitz et al. .................. 118/326
4,783,006 11/1988 Hayashi et al. ................. 118/300

*Primary Examiner*—Michael Wityshyn
*Assistant Examiner*—Charles K. Friedman
*Attorney, Agent, or Firm*—Flynn, Thiel, Boutell & Tanis

[57] ABSTRACT

A thin film forming apparatus which forms a thin film over a surface of a subtrate by spraying a mist of a source solution produced by atomization over the surface of the substrate heated to a given temperature. The film forming apparatus is provided with a pair of guide members for supporting and guiding the substrate at opposite sides of the same. The distance between the opposite inner surfaces of the guide members can be changed according to the width of the substrate to be supported and guided by the pair of guide members. The distance between the respective lower portions of the opposite inner surfaces of the pair of guide members is greater than the distance between the upper portions of the opposite inner surfaces of the same, so that the distribution of the flow rate per unit flow passage area of the mist of the source solution is uniform with respect to the width of the substrate and enables a thin film of a uniform thickness to be formed over the entire surface of the substrate.

8 Claims, 4 Drawing Sheets

THIN FILM FORMING APPARATUS HAVING ADJUSTABLE GUIDE

BACKGROUND OF THE INVENTION

1. Field of the Invention

The present invention relates to a thin film forming apparatus and, more specifically, to a thin film forming apparatus which forms a thin film over the surface of a substrate by spraying an atomized source solution over the surface of the heated substrate.

2. Description of the Prior Art

A conventional thin film forming apparatus uses a spraying system spray a source solution prepared beforehand over the surface of a substrate to form a thin film over the surface of the substrate. The thin film forming apparatus is provided with an atomizer for atomizing a previously prepared source solution, a nozzle disposed above the atomizer to spout the atomized source solution into a film forming chamber, and an exhaust duct connected to the film forming chamber. The atomizer comprises a mist box and a sprayer disposed in the mist box. Only a mist of comparatively small droplets of the source solution is spouted through the nozzle into the film forming chamber, and then the mist is exhausted from the film forming chamber through the exhaust duct.

Substrates arranged successively in a line are moved at a given speed from a preheating chamber through the film forming chamber to an exit. While being moved through the preheating chamber, the film forming chamber and the exit, the substrates are heated with a heater placed opposite to the backsides of the substrates. While the mist of the source solution flows through the film forming chamber along the surfaces of the heated substrates, a material contained in the solution reacts with oxygen contained the air or the moisture of the source solution and a generated oxide deposits on the surfaces of the substrates as a thin film.

This conventional thin film forming apparatus supports and guides the substrate at its opposite side edges by the side walls of the film forming chamber. The distance between the side walls of the film forming chamber corresponds to the width of the substrate. Therefore, the thin film forming apparatus is unable to process substrates having a width different from a particular width corresponding to the distance between the side walls of the film forming chamber.

The conventional thin film forming apparatus has a drawback in forming a transparent conductive film over the surface of a substrate, such as a glass substrate in that the thickness of the transparent conductive film is very small at the peripheral portions of the substrate as compared with the central portion as shown in FIG. 5(b). Such a drawback is inferred to be due to the fact that the flow rate per unit flow passage area of the mist in the vicinity of the opposite side edges of the substrate, particularly in the rear portion of the film forming chamber, is reduced by the resistance of the side walls and hence the flow rate of the mist in the vicinity of the side edges of the substrate is smaller than that of the mist in the central portion of the substrate.

Such a transparent conductive film having an irregular thickness forms interference fringes in the opposite sides of the substrate. Such a transparent, conductive film is unsatisfactory in appearance, and the thinner portions of the transparent, conductive film formed in the opposite sides of the substrate have no required characteristics. Accordingly, the opposite side portions of the substrate, where the thickness of the transparent, conductive film is excessively small, must be removed. For example, when a tin oxide film is formed over the surface of a glass substrate by a conventional thin film forming apparatus, the width of the side portions in which the difference of the thickness of the tin oxide film from the thickness of the tin oxide film formed in the central portion of the substrate is $\pm 5\%$ is as large as 30% of the width of the effective film forming area of the substrate excluding the opposite side edges of the substrate supported on the side walls. Therefore, practical width of the usable area of the substrate is as small as 70% of the width of the effective forming area. Thus, the conventional thin film forming apparatus is unsatisfactory.

SUMMARY OF THE INVENTION

Accordingly, it is a first object of the present invention to provide a thin film forming apparatus capable of forming thin films over the surfaces of substrates respectively having different widths.

A second object of the present invention is to provide a thin film forming apparatus capable of forming a thin film in a uniform thickness over the entire surface of a substrate including the side portions of the substrate.

In one aspect of the present invention, a thin film forming apparatus comprises an atomizer for atomizing a source solution, said atomizer being provided with a nozzle, a film forming chamber extending between a mist inlet through which a mist produced by atomizing the source solution is supplied to the film forming chamber and a mist outlet through which the mist supplied to the film forming chamber is exhausted, substrate feed means for feeding the substrate so that the film forming surface of the substrate defines the ceiling of the film forming chamber, a heater for heating the substrate, and a pair of guide members for supporting and guiding the substrate at opposite side portions thereof. The distance between the pair of guide members is adjustable.

Since the distance between the pair of guide members can be adjusted to the width of the substrate, the guide members are able to support and guide a substrate of an optional width during the forming of a thin film over the surface of the substrate. Thus, the thin film forming apparatus can be used for forming thin films on substrate of different widths and is able to operated at a high operation rate.

At least one of the pair of guide members may be movable with respect to a direction along the width of the substrate to adjust the distance between the pair of guide members.

In a second aspect of the present invention, a thin film forming apparatus is provided with a pair of guide members for supporting and guiding a substrate at the opposite side portions of the same, and is characterized in that the opposite side surfaces of the guide members extending below the opposite substrate supporting surfaces are inclined away from each other.

Generally, the flow rate per unit flow passage area of a mist of the source solution in the vicinity of the side walls of the film forming chamber is smaller than that in the central portion of the film forming chamber because of the resistance of the surfaces of the side walls against the flow of the mist of the source solution. However, the lower side surfaces of the guide members extending below the substrate supporting surfaces are inclined away from each other so that the distance between the lower side surfaces increases from the upper ends to the lower ends of the lower side surfaces, so that the flow rate per unit flow passage area is substantially uniform over the entire surface of the substrate. Thus, the thin film forming apparatus is capable of forming a thin film of a uniform thickness over the surface of the substrate and is able to operate at a high production rate.

DESCRIPTION OF THE PREFERRED EMBODIMENTS

The preferred embodiments of the present invention will be described hereinafter with reference to the accompanying drawings.

Figure 1:
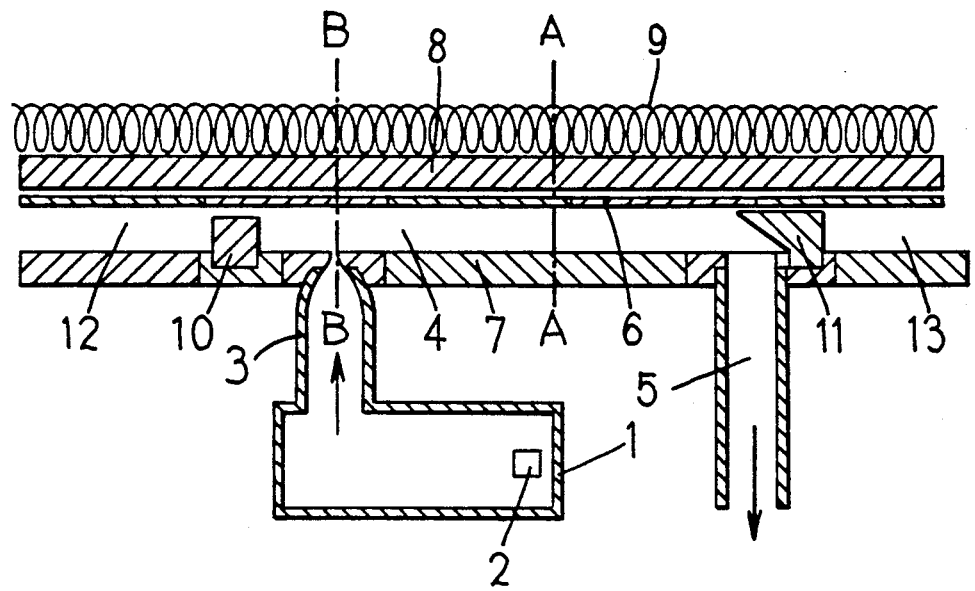
FIG. 1 is a fragmentary longitudinal sectional view of a thin film forming apparatus in a first embodiment according to the present invention.

Referring to FIG. 1, a thin film forming apparatus is provided with an atomizer 1 for atomizing a source solution. A nozzle 3 is attached to the upper wall of the atomizer 1 so as to spout a mist produced by atomizing the source solution upward into a film forming chamber 4 disposed over the atomizer 1. An exhaust duct 5 is connected to the right end, as viewed in FIG. 1, of the lower wall of the film forming chamber 4. The mist of the source solution is supplied through the nozzle 3 to the film forming chamber 4. The mist of the source solution supplied through the nozzle 3 to the film forming chamber 4 flows through the film forming chamber 4 and is exhausted through the exhaust duct 5. The film forming chamber 4 is separated by a partition wall 10 from a preheating chamber 12. A mist guide 11 separates the film forming chamber 4 from a substrate delivery chamber 13 and guides the mist toward the exhaust duct 5.

Figure 2A:
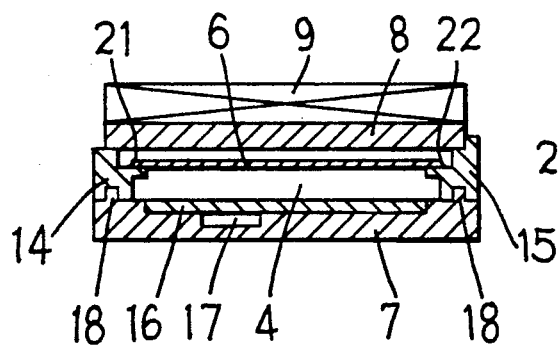
FIGS. 2(a) and 2(b) are sectional views taken along line A—A in FIG. 1.
Figure 2B:
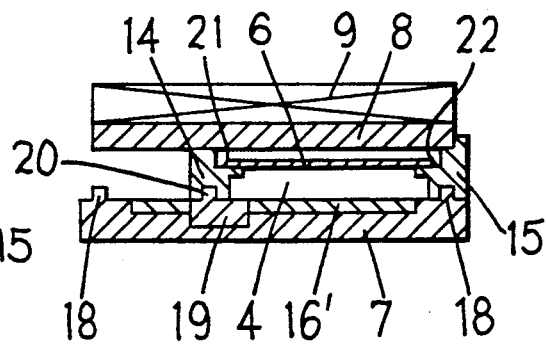

As shown in FIGS. 2(a) and 2(b), the film forming chamber 4 has the shape of a tunnel defined by a hearth 7 forming a bottom wall, and guide members 14 and 15 standing on opposite sides of the hearth 7 and forming opposite side walls. Supporting ribs 21 and 22 for supporting a substrate 6 at opposite sides thereof project respectively from the opposite side surfaces of the guide members 14 and 15. The substrate 6 supported on the supporting ribs 21 and 22 of the guide members 14 and 15 forms the upper wall of the film forming chamber 4. A plurality of substrates 6 are arranged successively in a line and are moved at a given speed through the film forming chamber from one side toward the other side as viewed in FIGS. 2(a) and 2(b) (from the left to the right as viewed in FIG. 1). A soaking plate 8 is disposed over the substrates 6 so as to extend from the preheating chamber 12 through the film forming chamber 4 and the substrate delivery chamber 13. A heating element 9 is disposed over the soaking plate 8 to heat the substrates to a given temperature.

Referring to FIGS. 2(a) and 2(b), guide rails 18 are extended along the opposite sides of the hearth 7 along the direction of conveyance of the substrates 6. A two-stepped groove 17 is formed in the upper surface of the hearth 7, and a hearth plate 16 is fitted in the upper portion of the groove 17. The hearth plate 16 can be removed to fit a guide rail member 19 in the lower portion of the groove 17 as shown in FIG. 2(b). The guide rail member 19 is provided on its upper surface with a guide rail 20 similar to the guide rails 18 of the hearth 7.

Figure 3A:
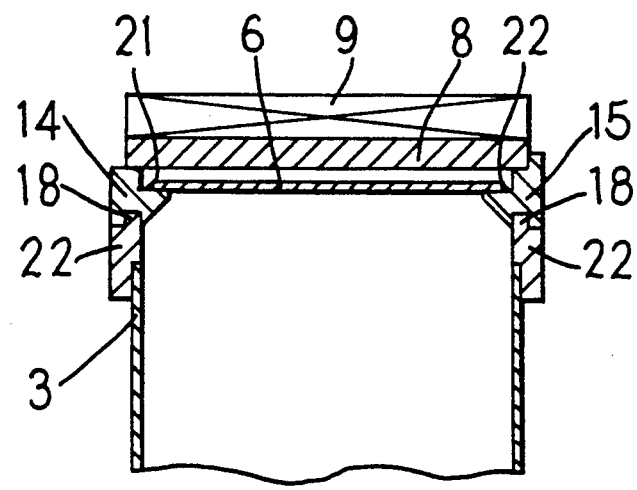
FIGS. 3(a) and 3(b) are sectional views taken along line B—B in FIG. 1.

When the guide members 14 and 15 are put on the guide rails 18 provided on the opposite sides of the hearth 7 as shown in FIGS. 2(a) and 3(a), substrates 6 having a comparatively large width can be supported on the guide members 14 and 15. In this state, the hearth plate 16 is fitted in the upper portion of the groove 17 to make the upper surface of the hearth 7 flat and to form a gap of a fixed height between the upper surface of the hearth plate and the lower surface of the substrates 6.

Figure 3B:
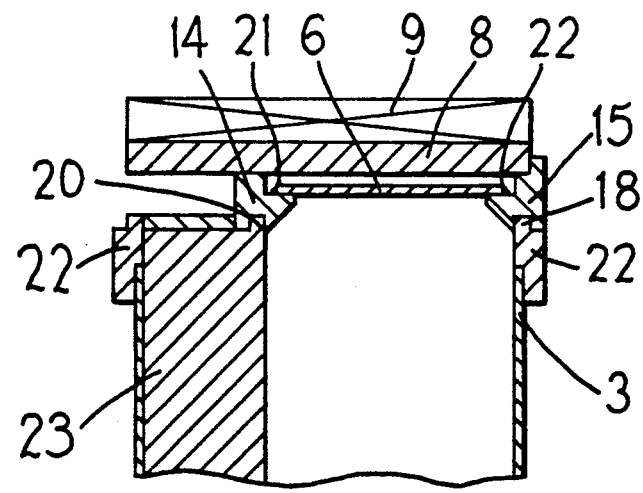

When the hearth plate 16 is removed, the guide rail member 19 is fitted in the lower portion of the groove 17, and the guide member 14 is put on the guide rail 20 of the guide rail member 19 as shown in FIGS. 2(b) and 3(b), substrates 6 having a comparatively small width can be supported on the guide members 14 and 15. In this state, hearth plate 16' having the same thickness as that of the hearth plate 16 and having widths smaller than that of the hearth plate 16 are fitted in the unoccupied areas of the upper portions of the groove 17 of the hearth 7 to form the same gap as that shown in FIGS. 2(a) an 3(a).

FIGS. 3(a) and 3(b) are sectional views of a portion of the thin film forming apparatus in which the spouting opening of the nozzle 3 opens into the film forming chamber 4. In forming a thin film on substrates 6 having a comparatively small width, the width of the spouting opening of the nozzle 3 is reduced by placing a width adjusting member 23 on one side of the spouting opening of the nozzle 3 as shown in FIG. 3(b).

The opposite lower surfaces of the supporting ribs 21 and 22 are deepened and are distant from each other so that the distance between the lower surfaces of the supporting ribs 21 and 22 increases from the upper ends to the lower ends of the lower surfaces 21 and 22. Consequently, the mist of the source solution flowing along the opposite sides of the substrates 6 is less subject to the resistance of the side surfaces of the guide members 14 and 15 against the flow of the mist and hence the difference in the flow rate per unit flow passage area of the mist between a portion of the film forming chamber 4 around the central portion of the substrate 6 and around the side edges of the substrate 6 is not very large. Accordingly, a thin film of a uniform thickness is formed over the entire surface of the substrate 6 and the thickness of portions of the thin film near the side edges of the substrate 6 is not thinner than that of a portion of the thin film around the central portion of the substrate 6.

Figure 5:
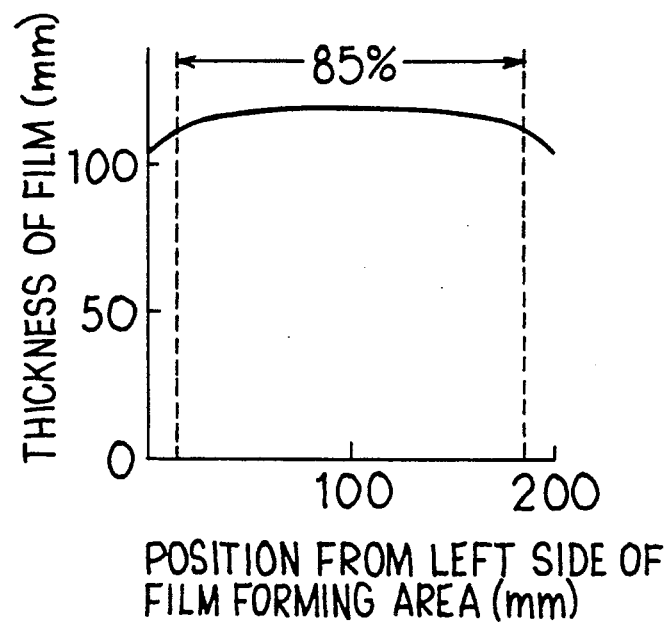
FIGS. 5(a) and 5(b) are graphs showing the variation of the thickness of a thin film formed over the surface of a substrate with distance from one side edge of the substrate.
Figure 5:
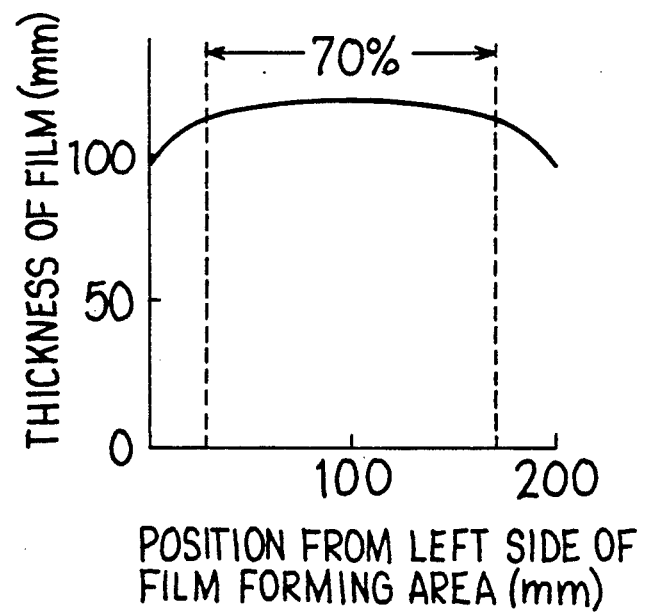

A tin oxide film, i.e., a transparent conductive film, was formed on a glass substrate 6 by the thin film forming apparatus provided with the guide members 14 and 15 having supporting ribs 21 and 22 having inclined lower surfaces. The thickness of the tin oxide film formed in a 200 mm wide film forming area, namely, an area in the surface of the glass substrate 6 excluding the edge portions seated on the guide members 14 and 15 and not exposed to the mist of the source solution, was measured. The measured results are shown in FIG. 5(a). FIG. 5(a) shows the variation of the thickness of the tin oxide film with the distance along the width of the glass substrate 6 from one side of the film forming area.

The source solution was a mixed solution of 15% $SnCl_4$, 200% mol $NH_4F$ and 5% alcohol. The source solution was atomized at an atomizing rate of 1 l/hr, and the mist of the source solution was supplied through the nozzle 3 to the film forming chamber 4 together with air which was supplied at a rate of 1 l/min. The substrate 3 was passed through the film forming chamber 4 in three minutes.

A tin oxide film was formed as a control under the same film forming conditions, except that the thin film forming apparatus was provided with guide members having opposite, vertical, flat surfaces. The distribution of measured values of the thickness of the tin oxide film along the width of the substrate is shown in FIG. 5(b).

The ratio of the width of a portion of the tin oxide film, in which the variation of the thickness of the tin oxide film from the average thickness of the tin oxide film formed in the central portion of the film forming area is within ±5%, to the width of the film forming area was about 85% for the tin oxide film formed by the thin film forming apparatus of the present invention (FIG. 2(a)) and was as small as about 70% for the tin oxide film formed by the thin film forming apparatus provided with the guide members having opposite, vertical, flat surfaces.

Desirably, the height of the film forming chamber 4, namely, the distance between the film forming surface of the substrate 6 and the upper surface of the hearth plate 16 (16'), is in the range of 5 to 80 mm to enable the mist of the source solution to touch the film forming surface of the substrate 6 for reaction at a high probability. Thus, the film forming chamber 4 having a height in the range of 5 to 80 mm enables a small amount of the source solution to react at a high rate of reaction and forms a thin film of satisfactory quality.

Supporting the substrate 6 in the film forming chamber 4 with its film forming surface in a horizontal position makes the film forming rate uniform over the entire length of the film forming chamber 4. Therefore, a homogeneous thin film can be formed at a comparatively low temperature when the length of the film forming zone, namely, the size of the film forming zone with respect to the movement of the substrate 6, is in the range of 50 to 300 cm.

Figure 4A:
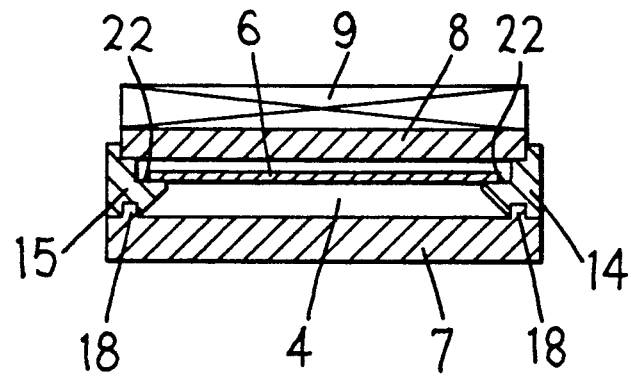
FIGS. 4(a), 4(b) and 4(c) are sectional views of a thin film forming apparatus in a second embodiment according to the present invention, similar to FIG. 2(a) and 2(b)
Figure 4B:
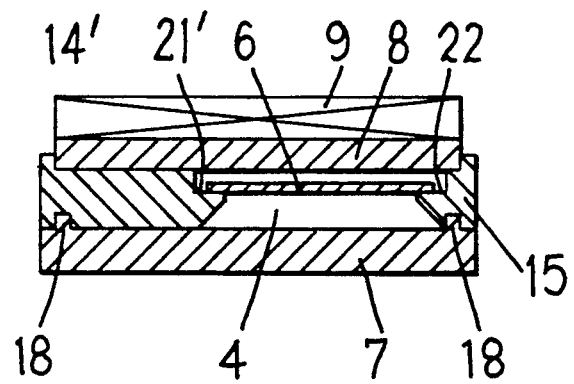
Figure 4C:
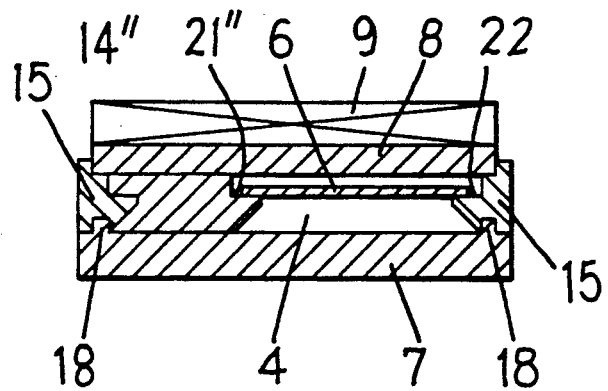

FIGS. 4(a), 4(b), and 4(c) show a thin film forming apparatus in a second embodiment according to the present invention. This thin film forming apparatus is provided with guide members 14 and 15 for supporting and guiding a wider substrate 6. In supporting a narrower substrate 6, the guide member 14 is replaced with another guide member 14' having a width grater than that of the guide member 14 (FIG. 4(b)) or an additional guide member 14" is combined with the guide member 14 (FIG. 4(c)), instead of shifting the guide member 14. Naturally, it is also possible to replace both the guide members 14 and 15 respectively with guide members having a width greater than that of the guide members 14 and 15 or to combine both the guide members 14 and 15 respectively with additional guide members.

What is claimed is:

1. A thin film forming apparatus for forming a thin film on a surface of a substrate, comprising:
   an atomizer for atomizing a source solution;
   a film forming chamber provided above said atomizer, said film forming chamber having a first end and a second end;
   a nozzle provided on an upper portion of said atomizer, said nozzle being connected to and opening into said first end of said film forming chamber so as to be able to introduce atomized source solution therein;
   an exhaust duct connected to said second end of said film forming chamber for removing said atomized source solution therefrom;
   substrate feeding means for feeding said substrate into said film forming chamber in such a manner that said surface of said substrate forms the ceiling in said film forming chamber;
   heating means for heating the substrate; and
   a pair of adjustable guide members provided opposite to each other at opposite sides of the film forming chambers so as to be able to support and guide opposite lateral edges of said substrate during the feeding of said substrate into said film forming chamber, at least one of said guide members being adjustable in the lateral direction of said substrate.

2. A thin film forming apparatus according to claim 1, wherein said guide members are provided with opposite upper and lower inner surfaces, the distance between said opposite lower inner surfaces being greater than the distance between said opposite upper inner surfaces.

3. A thin film forming apparatus according to claim 1, wherein the width of the nozzle opening can be adjusted according to the distance between said guide members.

4. A thin film forming apparatus according to claim 2, wherein the distance between the inner surfaces of said guide members gradually increases from the upper inner surfaces to the lower inner surfaces.

5. A thin film forming apparatus according to claim 1, wherein the distance between said surface of said substrate and the surface of the film forming chamber facing said substrate source is in the range of 5 to 80 mm.

6. A thin film forming apparatus according to claim 1, wherein said substrate is fed into said film forming chamber in such a manner that said surface of said substrate is in a horizontal position.

7. A thin film forming apparatus for forming a thin film on a surface of a substrate, comprising:
   an atomizer for atomizing a source solution;
   a film forming chamber provided above said atomizer, said film forming chamber having a first end and a second end;
   a nozzle provided on an upper portion of said atomizer, said nozzle being connected to and opening into said first end of said film forming chamber so as to be able to introduce atomized source solution therein;
   an exhaust duct connected to said second end of said film forming chamber for removing said atomized source solution therefrom;
   substrate feeding means for feeding said substrate into said film forming chamber in such a manner that said surface of said substrate is in a horizontal position and forms the ceiling in said film forming chamber;
   heating means for heating the substrate; and
   a pair of adjustable guide members provided opposite to each other at opposite sides of the film forming chambers so as to be able to support and guide opposite lateral edges of said substrate during the feeding of said substrate into said film forming chamber, said guide members having opposite inner surfaces which gradually increase in distance from each other from upper surfaces to lower surfaces thereof, at least one of said guide members being adjustable in the lateral direction of said substrate.

8. A thin film forming apparatus according to claim 7, wherein the width of the nozzle opening can be adjusted according to the distance between said guide members.

* * * * *

UNITED STATES PATENT AND TRADEMARK OFFICE
CERTIFICATE OF CORRECTION

PATENT NO. : 5 086 727
DATED : February 11, 1992
INVENTOR(S) : Mikio SEKIGUCHI et al It is certified that error appears in the above-identified patent and that said Letters Patent is hereby corrected as shown below:

Column 6, line 40; change "source" to ---surface---.

Signed and Sealed this

First Day of June, 1993

Attest:

MICHAEL K. KIRK

Attesting Officer

Acting Commissioner of Patents and Trademarks